(12) United States Patent
Hoogendoorn

(10) Patent No.: US 11,734,466 B2
(45) Date of Patent: Aug. 22, 2023

(54) METHOD AND APPARATUS FOR PROVIDING PRE-MANUFACTURING FEEDBACK ON THE DESIGN OF AN OBJECT TO BE FORMED THROUGH SOLIDIFICATION OF A FLUID IN A MOLD

(71) Applicant: 3D Hubs B.V., Amsterdam (NL)

(72) Inventor: Eelco Hoogendoorn, Amsterdam (NL)

(73) Assignee: 3D Hubs B.V., Amsterdam (NL)

( * ) Notice: Subject to any disclaimer, the term of this patent is extended or adjusted under 35 U.S.C. 154(b) by 60 days.

(21) Appl. No.: 16/878,810

(22) Filed: May 20, 2020

(65) Prior Publication Data

US 2021/0365598 A1 Nov. 25, 2021

(51) Int. Cl.
*G06F 119/08* (2020.01)
*G06F 111/10* (2020.01)
*G06F 119/18* (2020.01)
*G06F 30/12* (2020.01)

(52) U.S. Cl.
CPC .......... *G06F 30/12* (2020.01); *G06F 2111/10* (2020.01); *G06F 2119/08* (2020.01); *G06F 2119/18* (2020.01)

(58) Field of Classification Search
CPC .. G06F 30/12; G06F 2111/10; G06F 2119/08; G06F 2119/18; G06F 2113/22; Y02P 90/02
USPC .......................................................... 703/1, 2
See application file for complete search history.

(56) References Cited

U.S. PATENT DOCUMENTS

| | | | |
|---|---|---|---|
| 6,698,852 B2* | 3/2004 | Yoshida | B22D 17/22 361/679.55 |
| 6,816,820 B1* | 11/2004 | Friedl | B29C 33/3835 703/2 |
| 8,655,476 B2* | 2/2014 | Wang | G06F 30/23 700/146 |
| 9,409,335 B1 | 8/2016 | Su et al. | |
| 11,000,982 B2* | 5/2021 | Stoehr | G05B 19/41885 |

(Continued)

FOREIGN PATENT DOCUMENTS

| CN | 110111861 A | 8/2019 |
|---|---|---|
| WO | 2012/031161 A1 | 3/2012 |

OTHER PUBLICATIONS

Vu et al.: "Nonisothermal glass molding for the cost-efficient production of precision freeform optics", Optical Engineering, Soc. of Photo-Optical Instrumentation Engineers, vol. 55, No. 7, Jul. 1, 2016, pp. 071207-1 to 071207-13.

(Continued)

*Primary Examiner* — Juan C Ochoa
(74) *Attorney, Agent, or Firm* — N.V. Nederlandsch Octrooibureau

(57) ABSTRACT

A computer-implemented method, computer program, system and apparatus for computing a thermal thickness and providing pre-manufacturing feedback on a design of a three-dimensional physical object that is to be formed by solidification of a fluid in a mold. An equation is solved, representing heat release through the cavity-mold interface when the object is formed. The thermal thickness and its uniformity provide insight in the manufacturability of the object, and may be used to automatically generate pre-manufacturing feedback. The thermal thickness and pre-manufacturing feedback are transmitted or displayed to a user.

18 Claims, 11 Drawing Sheets

(56) References Cited

U.S. PATENT DOCUMENTS

| | | | | |
|---|---|---|---|---|
| 2004/0047935 | A1* | 3/2004 | Moss | B29C 45/2704 425/145 |
| 2005/0114104 | A1* | 5/2005 | Friedl | B29C 33/3835 703/2 |
| 2005/0125092 | A1* | 6/2005 | Lukis | G06Q 30/0611 700/200 |
| 2009/0125418 | A1* | 5/2009 | Lukis | B22C 19/04 705/26.1 |
| 2009/0319454 | A1* | 12/2009 | Regli | G06V 10/40 706/13 |
| 2011/0295405 | A1* | 12/2011 | Sudo | C30B 15/10 700/104 |
| 2012/0059637 | A1* | 3/2012 | Yu | B29C 33/3835 703/6 |
| 2015/0269290 | A1* | 9/2015 | Nelaturi | G06F 30/20 703/6 |
| 2016/0052185 | A1* | 2/2016 | Konchan | G06F 30/00 29/592 |
| 2016/0133771 | A1* | 5/2016 | Pelletier | H02S 40/22 136/259 |
| 2019/0152114 | A1* | 5/2019 | Chang | G06F 30/23 |
| 2021/0350051 | A1* | 11/2021 | Potargent | G06F 16/29 |

OTHER PUBLICATIONS

Zhou et al.: "Mold cooling simulation of the pressing process in TV panel production", Simulation Modelling Practice and Theory, vol. 13, No. 3, Apr. 1, 2005, pp. 273-285.

* cited by examiner

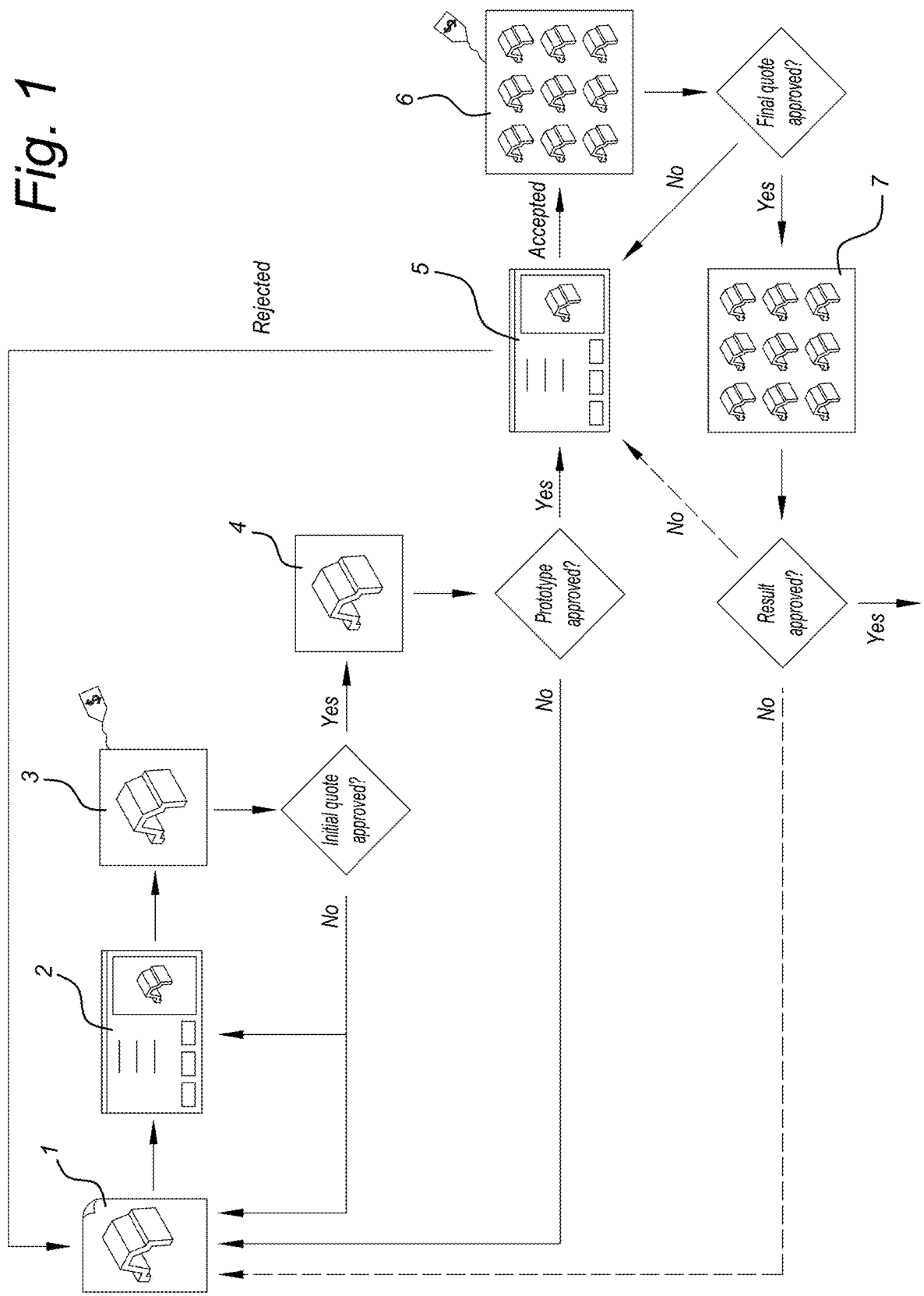

*Fig. 5C*
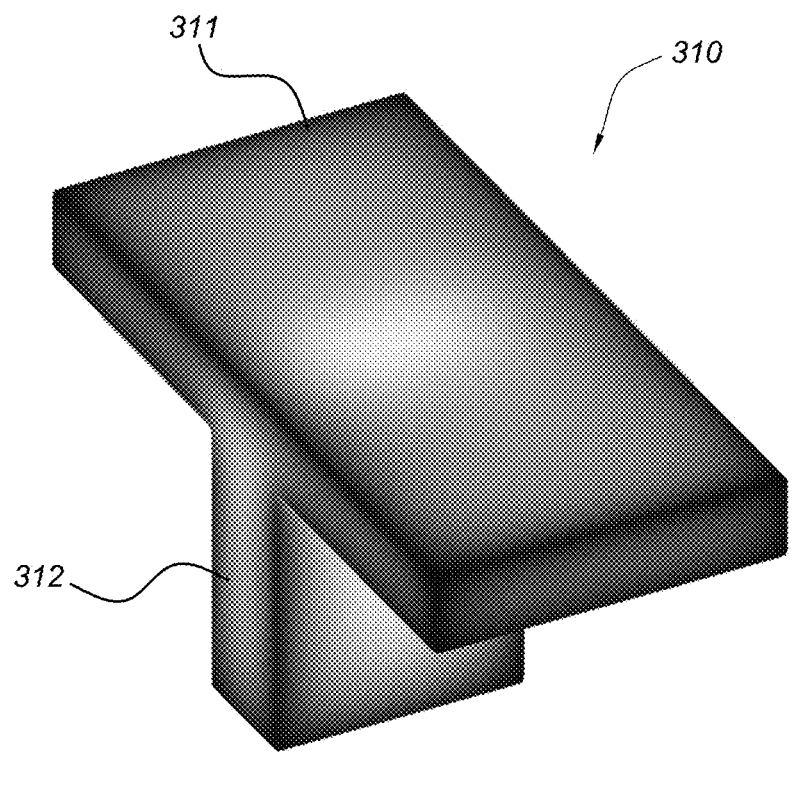
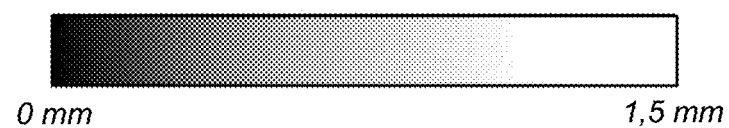
0 mm            1,5 mm

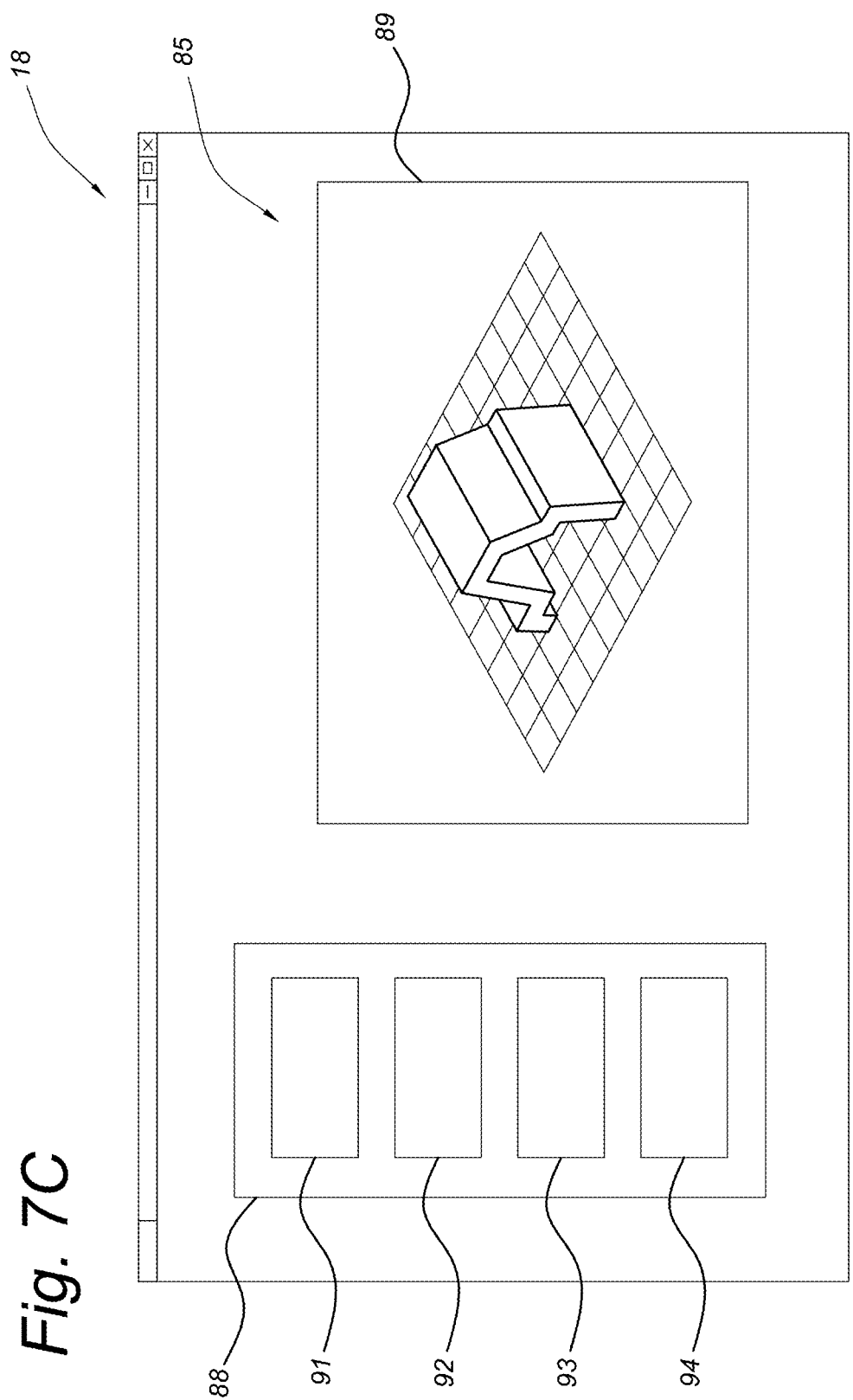

US 11,734,466 B2

METHOD AND APPARATUS FOR PROVIDING PRE-MANUFACTURING FEEDBACK ON THE DESIGN OF AN OBJECT TO BE FORMED THROUGH SOLIDIFICATION OF A FLUID IN A MOLD

TECHNICAL FIELD

The invention relates to a method, system and apparatus for providing pre-manufacturing feedback on a design of a three-dimensional physical object that is to be formed through solidification of a fluid in a mold. In addition, the invention relates to a manufacturing process wherein pre-manufacturing feedback is used, and a component manufactured in such a manufacturing process. Furthermore, the invention relates to a computer program product arranged to perform the proposed method, and a computer readable medium comprising such a computer program.

BACKGROUND ART

Molded and cast parts or components, such as injection molded plastic components or investment cast components, are used in various industries. A characterizing feature for such molded and cast components is that their formation relies on the solidification of a fluid in a mold. During formation of the object, a liquid-to-solid phase transition of the material being formed takes place.

For some designs, uneven solidification may take place, which can lead to the occurrence of global deformations of the resulting part (warping) above a certain acceptable limit, or unacceptable local deformations (sink marks). Typically, manufacturers want to ensure that their components can be manufactured without significant defects before starting production of the mold and components. It will be understood that production of a mold in itself may be a significant part of the overall cost of the operation. To that use, manufacturers and product designers have begun to use computer aided engineering techniques to simulate or model the complex flows in a mold and use the simulation output to assess the feasibility of manufacturing a component based on its design.

For example, patent document WO 2012/031161 A1 describes a method, system, and apparatus, including computer programs encoded on a computer storage medium, for actively simulating an injection mold model. A three-dimensional CAD model is identified representing an injection mold cavity, wherein the mold cavity includes a location of at least one gate. The simulation results can be used to better understand the manufacturing process, and to integrate the obtained knowledge into a component design. In particular, an optimizer module can determine a preferred location for a mold cavity gate based on a simplified strip segment model for optimized filling of the mold cavity.

A disadvantage of known methods for assessing the feasibility of manufacturing a component based on its design is that the methods have not been shown suitable for providing feedback on the robustness of the process regarding manufacturing flaws in the resulting component. In particular, such data is not available early enough in the process from design to production. It would be desirable to provide a method for assessing the properties of the manufacturing process that can be used early in the design process of an object formed through solidification of a fluid in a mold.

SUMMARY OF INVENTION

Therefore according to a first aspect of the invention, there is provided a method for providing a thermal thickness for a design of a three-dimensional physical object that is to be formed through solidification of a fluid in a cavity of a mold. The thermal thickness is here considered as a measure of thickness that provides insight into the thermal process of cooling the liquid in a mold. The thermal thickness value is positively correlated with the time for the surface of an object to solidify. A larger thermal thickness means that more liquid volume is present behind the surface, and as such that more heat needs to escape through the boundary of that surface. The method comprises the steps of receiving a digital model representing the mold or an object to be formed in the mold; determining, by a processor, a solution domain comprising at least the cavity-mold interface; defining, using the processor, a computational grid in the solution domain; solving, using the processor, an equation on the computational grid, the equation representing heat release through the cavity-mold interface when the object is formed through solidification of the fluid in the cavity of the mold; computing, using the processor, a thermal thickness defined as the temperature difference over the cavity-mold interface; and transmitting thermal thickness data to a user or displaying a projection of the thermal thickness data onto the cavity-mold interface.

As an alternative to transmitting or displaying the thermal thickness data, or in addition thereto, the thermal thickness is used to automatically generate pre-manufacturing feedback. The method then alternatively, or in addition, comprises the steps of automatically generating pre-manufacturing feedback by, using the processor, comparing the computed thermal thickness with a data set stored on a memory connected to the processor, the data set comprising data on the thermal thickness of a plurality of reference objects and the manufacturability of each of the reference objects of the plurality of reference objects; and transmitting or displaying the pre-manufacturing feedback to a user.

The thermal thickness value and pre-manufacturing feedback can be provided early in the design process of an object formed through solidification of a fluid in a mold. The method requires a digital model that includes the cavity-mold interface. This interface can be identified based on a digital design of the part itself, as its exterior surface. Alternatively, the cavity-mold interface can be identified in a model of the mold, as an inner surface of the mold. It is not needed to have detailed designs of both the object and the mold. In practice this most often means that a detailed design of the mold is not required. In addition, also other process parameters for manufacture besides the geometry of the object to be manufactured are not required for the computation of the thermal thickness.

In an embodiment, the part is to be manufactured through an injection molding process. In a preferred embodiment, the thermal thickness computation is independent of the configuration of the injection gates and other injection molding process variables. To enable application of the method in an early stage, it is advantageous that no information on injection molding process parameters, such as the number and location of injection points or gates, the injection pressure or temperature of the liquid, are required. The method may even be independent of the material of the mold or its thickness and construction.

In addition, the thermal thickness and/or pre-manufacturing feedback can be provided rapidly, and is computationally cheap for a processor to generate. Preferably, it is generated in less than 1 second and the thermal thickness and/or pre-manufacturing feedback can therefore, dependent on the platform, be provided to a user in almost real-time. In an embodiment wherein the method is carried out on a user's personal computer, the feedback is generated preferably in less than 3 seconds or less than 5 seconds after a user has entered a request to compute the thermal thickness and/or feedback. In an embodiment wherein the method is carried out over a network-based platform, the thermal thickness and/or pre-manufacturing feedback are preferably provided in less than 10 seconds or less than 20 seconds after a digital model has been uploaded.

In an embodiment, the method further comprises comparing a measure of uniformity of the computed thermal thickness with a feasibility range for the thermal thickness. The uniformity of the thermal thickness comprises information on the likelihood of a certain design to be manufactured without problems and/or aesthetic defects. As a measure of uniformity, the difference between the global minimum thermal thickness and global maximum thermal thickness in a design may be used. Alternatively, a local gradient of thermal thickness may be used for the assessment. It will be understood by the skilled person that alternative measures of uniformity exist and may be suitable also. The comparison may be made by the user after receiving the thermal thickness data and feasibility ranges. Alternatively, the comparison may be made automatically by the processor as part of generating the pre-manufacturing feedback.

In an embodiment, the method further comprises comparing the thermal thickness with a feasibility range for the thermal thickness. The comparison may be made by the user after receiving the thermal thickness data and feasibility ranges. Alternatively, the comparison may be done automatically by the processor as part of generating the pre-manufacturing feedback.

In an embodiment, the method further comprises comparing the thermal thickness with the thermal thickness of a plurality of reference objects, and using data on the manufacturability of each of the reference objects to assess the manufacturability of the three-dimensional object. This may be done automatically by the processor as part of generating the pre-manufacturing feedback e.g. by using machine learning applications and a large database of thermal thickness data and manufacturability data on a large number of objects. Alternatively, a user may compare displayed results with a set of reference examples which contain feasible designs and their thermal thickness as well as unfeasible designs and their thermal thickness. This helps both skilled designers and unskilled designers to assess the feasibility of their own design.

In an embodiment, the method further comprises defining and computing an indicator variable on the cavity-mold interface, indicating where defects are likely to show; transmitting the indicator variable to the user, or projecting the indicator variable on the cavity-mold interface and displaying the projection to the user. The indicator variable may be derived from a degree of exceeding feasibility ranges for the uniformity of the thermal thickness, the minimum and maximum value, or based on the output of a machine learning algorithm that has be trained with a database of feasible and non-feasible part designs. The indicator variable may be a binary variable, which for instance indicates success with a "1" or green color, and defects with a "0" or red color. The indicator variable may also define a discrete amount of likelihoods, e.g., a traffic light system with red, green, and orange, or provide a continuous probability on successful manufacture and aesthetic defects.

In an embodiment, the thermal thickness is used to estimate a cycle time for the mold. This feature may be used in any combination with features of other embodiments of either one of the methods for providing a thermal thickness or pre-manufacturing feedback as long as appropriate. The thermal thickness provides information on the cooling process, and can therefore also be used to provide an estimate on the required cooling time before a part may be ejected from the mold. This allows for an estimation of the total time required for producing a part, which may for instance be used to estimate the total time required for producing a batch of parts, to select how many molds to use, or for providing a quote for the production of a batch of parts. Since also this feedback can be made available during the early design stages, a designer can use this information to change or approve a design.

In an embodiment, the equation accounts for heat resistance of the mold. This feature may be used in any combination with features of other embodiments of either one of the methods for providing a thermal thickness or pre-manufacturing feedback as long as appropriate. A thermal conductivity coefficient may be used to describe the heat conductive properties of the mold. Dependent on the type of manufacturing process and the material used for the mold this coefficient may differ. Accounting for the heat conductive properties leads to a more accurate representation of the solidification process, but also adds some complexity to the method. The skilled person will understand that there is a large variety of product, process and material properties or parameters whose effect could be implemented in the formulation of the equation, either explicitly or using parametrizations.

For example, in embodiments the effects of the material of the mold, the material of the fluid or, the geometry of the mold, the location of cooling channels in the mold and/or the position of fluid injection points (in case of injection molding) are implemented. It will be understood that this leads to a trade-off between a situation wherein a more complex model is used requiring more input data to possibly provide a more accurate result for the thermal thickness, versus a situation wherein a model is used that is less complex by nature and as such requires less input data but possibly also provides a slightly less accurate result.

In embodiments, a relative thermal conductivity of the mold can be imposed, defined as the ratio between the thermal conductivity of the mold and the thermal conductivity inside the mold. This feature may be used in any combination with features of other embodiments of either one of the methods for providing a thermal thickness or pre-manufacturing feedback as long as appropriate. It may be easier to provide an approximate ratio than exact numbers for the thermal conductivity of both the fluid and the mold. The equation may be a diffusion equation. The equation may also be a steady-state diffusion equation. The equation may further be a screened-Poisson equation.

In an embodiment, the thermal thickness is a variable that is independent of the material properties of the material in the cavity of the mold. This feature may be used in any combination with features of other embodiments of either one of the methods for providing a thermal thickness or pre-manufacturing feedback as long as appropriate. This means that the thermal thickness is a geometrical quantity, which does not change depending on the material properties of the fluid or solidified fluid. This is advantageous when a user wants to apply the method at an early stage before a material has been selected. In particular, although the thermal thickness may not depend on the material properties of the material in the cavity of the mold, the feasibility of a design to be manufactured of a certain material may be assessed using the thermal thickness. Different degrees of uniformity, and the minimum and maximum thermal thicknesses that lead to a feasible design may depend on the selected material. Therefore in an embodiment, the method further comprises using the thermal thickness to assist in selecting a suitable material for manufacture of the object. This additional step may be used independently or in any combination with any of the steps or features of other embodiments.

It will be understood that the thermal thickness computation may be relevant for several other processes as well. Although the present invention has been described in the context of injection molded parts, the thermal thickness computation may be implemented for any other method wherein a liquid solidifies in a mold. For example, in an embodiment, the object is to be manufactured through an investment casting process. Also for the quality of investment cast products it is advantageous to be able to make an assessment of the solidification properties at an early stage.

The thermal thickness may be a piecewise continuous variable or be discretized or represented as a binary parameter or as the traffic light representation discussed above. In a preferred embodiment, the thermal thickness is a continuous variable. Herein the term "continuous variable" is used to both indicate that small variations in the spatial coordinates lead to small variations of the thermal thickness, as well as that small variations in the object geometry lead to small variations in the thermal thickness. This is advantageous as it contributes to the intuitive character of the parameter. This feature may be used in any combination with features of other embodiments of either one of the methods for providing a thermal thickness or pre-manufacturing feedback as long as appropriate.

In an embodiment, the method further comprises applying a mapping to the thermal thickness before transmitting and/or displaying it to the user. The thermal thickness data, once computed, may be mapped into a different variable, such as a normalized thermal thickness, to further aid the intuitive character of the parameter. The mapping may be continuous, providing a mapped variable that is also continuous. Alternatively, the thermal thickness may be mapped into a discrete variable, such as a binary variable or a variable according to the traffic light representation discussed above. This additional step may be used independently or in any combination with any of the steps or features of other embodiments.

It will be understood that some of the features in the embodiments are not combinable. For example, the embodiments wherein the manufacturing process of the object is specified as injection molding are not combinable with embodiments wherein the manufacturing process of the object is specified as an investment casting process. Nevertheless, the skilled person will understand which combinations are appropriate. Therefore all features of embodiments as described hereinabove should be considered to be combinable with each other in any combination as long as appropriate. Moreover, each of these features should be considered both combinable with the method for computing a thermal thickness as well as with the method for providing pre-manufacturing feedback.

According to another aspect of the invention and in accordance with the advantages and effects described hereinabove, there is provided a computer program comprising instructions which, after a three-dimensional digital model representing a cavity or an object to be formed in a cavity is received, causes the computer to carry out the method for computing a thermal thickness and/or providing pre-manufacturing feedback. The computer program may comprise instructions according to any of the embodiments of the method for providing a thermal thickness or pre-manufacturing feedback as described hereinabove.

In an embodiment, the computer program is an add-on computer software code configured to run as an internal component within a CAD modelling suite. Here a CAD modelling suite is used to denote any type of conventional product design software. The three-dimensional digital model representing a cavity or an object to be formed in a cavity is received from within the CAD modelling suite. This allows a designer to take the manufacturability of a part into account from within the design studio. The easy and quick feedback provides the designer with the opportunity to directly check the manufacturability without uploading or transmitting the design to another party for analysis. In addition, the designer may easily carry out multiple manufacturability analyses on just slightly different designs, which allows the designer to learn quickly what features of a model design would likely lead to problems in the manufacture and/or are associated with a high cost of manufacture due to excessive cooling times.

According to yet another aspect of the invention and in accordance with the advantages and effects described hereinabove, there is provided a non-transitory computer-readable medium having stored thereon the computer program as described above. The computer readable medium may have stored therein a computer program according to any of the embodiments as described hereinabove.

According to yet another aspect of the invention and in accordance with the advantages and effects described hereinabove, there is provided an apparatus for computing a thermal thickness parameter based on the design of a three-dimensional physical object that is to be formed through solidification of a fluid in a mold. The apparatus comprises a processor and a memory storing instructions. The instructions, when executed by the processor, cause the processor to: receive a digital model representing the mold or an object to be formed in the mold; determine a solution domain comprising at least the cavity-mold interface; define a computational grid in the solution domain; solve an equation on the computational grid, the equation representing heat release through the cavity-mold interface when the object is formed through solidification of the fluid in the cavity of the mold; compute a thermal thickness defined as the temperature difference over the cavity-mold interface; and transmit thermal thickness data to a user.

Alternatively, or in addition to transmitting thermal thickness data the processor may automatically generate pre-manufacturing feedback and transmit or display the pre-manufacturing feedback to the user. The pre-manufacturing feedback may be generated by comparing the computed thermal thickness with a data set stored on a memory connected to the processor, the data set comprising data on the thermal thickness of a plurality of reference objects and the manufacturability of each of the plurality of reference objects.

In an embodiment, the apparatus further comprises a display, and the instructions further cause the processor to project the computed thermal thickness data onto a visualization of the cavity-mold interface, and display it on the display. This feature may be used in combination with the apparatus for providing a thermal thickness as well as in combination within the apparatus for providing pre-manufacturing feedback. In accordance with the advantages and effects described above, the apparatus can provide quick feedback in an early design stage. The apparatus may be a personal computer of the user having a program installed thereon that allows carrying out of the method and outputs it to the user. Alternatively, the apparatus may be positioned at a remote location where the calculations are performed and wherefrom the thermal thickness data is transmitted to the user.

According to a further aspect of the invention and in accordance with the advantages and effects described hereinabove, there is provided a network-based system for providing pre-manufacturing feedback on the design of a three-dimensional physical object that is to be formed through solidification of a fluid in a mold. The system comprises a server, comprising at least one processor and a memory operatively connected to the server; and a user interface for uploading a digital model of the physical object to the server. The server is configured to carry out the method for computing thermal thickness data or providing pre-manufacturing feedback according to any of the embodiments described above. The computed thermal thickness and/or pre-manufacturing feedback are transmitted to the user through the server.

It will be understood that the server may comprise a single processor and memory at one location. The server may also comprise a plurality of processors and multiple memory units, wherein the various steps are distributed between several processors and/or information is retrieved from several different memory units.

In an alternative embodiment, there is provided a network-based system for providing pre-manufacturing feedback on the design of a three-dimensional physical object that is to be formed through solidification of a fluid in a mold. The system comprises a server, comprising at least one processor and a memory operatively connected to the server; and a user interface for uploading a digital model of the physical object to the server. The server is configured to transmit computer instructions to the user, which computer instructions cause a device on the user end to carry out any of the methods as described above. The computed thermal thickness and/or pre-manufacturing feedback are displayed locally to the user. In addition, the thermal thickness data and pre-manufacturing feedback may be transmitted from the user device to the server. Having the computer program run on the user end makes the method more stable, and less prone to failure when the network connection lacks stability.

According to yet another aspect of the invention and in accordance with the advantages and effects described hereinabove, there is provided a manufacturing process for an injection molded part, comprising a step of assessing the manufacturability of the design according to any embodiment of the method for providing thermal thickness data and/or pre-manufacturing feedback.

According to a final aspect of the invention and in accordance with the advantages and effects described hereinabove, there is provided an injection molded part, manufactured according to a process wherein a pre-manufacturability analysis has been performed according to any embodiment of the method for providing thermal thickness data or pre-manufacturing feedback. as described above.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "20" may be labeled as "20a" and "20b". The reference number may be used without an appended letter (e.g. "20") to generally refer to an unspecified instance or to all instances of that element, while the reference number will include an appended letter (e.g. "20a") to refer to a specific instance of the element.

FIG. 1 schematically shows a process for designing and manufacturing an injection molded component.

FIG. 5a-c show representations of the thermal thickness of different components.

FIGS. 7a-7c present an embodiment of a graphical user interface that can be used in the system of FIG. 6.

Figure 2A:
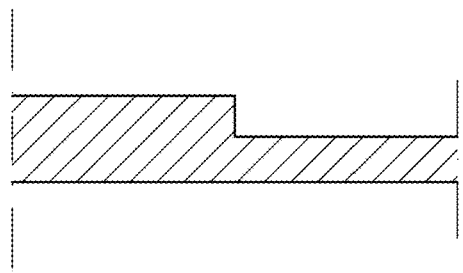
FIG. 2a-d show a number of feasible and unfeasible model designs.
Figure 2B:
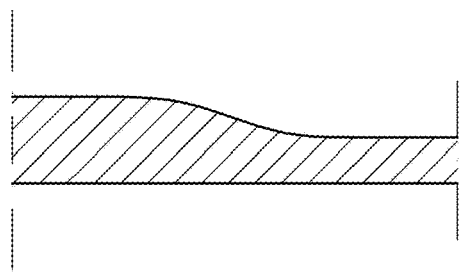
Figure 2C:
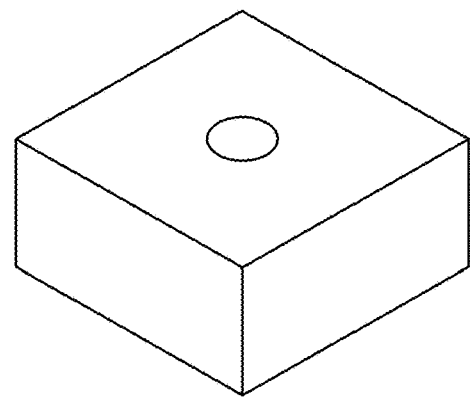
Figure 2D:
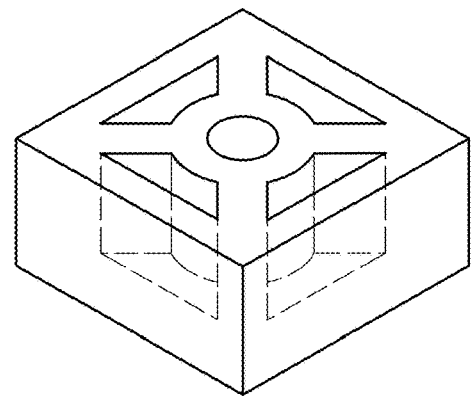

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Molding or casting processes, such as injection molding or investment casting, are typically characterized by relatively high start-up costs and a per-unit cost that decreases with large volumes. Therefore these techniques are widely used to manufacture identical parts at very high volumes. Before such large volumes are produced, a long and generally costly design process precedes.

FIG. 1 shows an exemplary embodiment of a process for designing and manufacturing an injection molding component. The process starts with a designer or engineer making an initial model design 1. This initial model design 1 will typically be a digital model representing the component to be manufactured and undergoes many design cycles before reaching a stage wherein the design is ready for prototyping.

After finalizing the initial design 1, the designer may approach a manufacturer 2 to provide a quote 3 for making a prototype 4. The step of prototyping is essential for launching a successful product as design errors can be identified early, while the cost of making changes to the design 1 are still low. The designer may be in direct contact with the manufacturer 2, or may use an intermediary company that provides an ordering platform for a designer but outsources the manufacture. The prototype or prototypes can be manufactured using low accuracy injection molding, but may also be produced using for instance an additive manufacturing technique or CNC machining. When injection molding is used for prototyping, realistic prototypes can be manufactured because the actual process and mold design are simulated, but it is also a prototyping solution with relatively high cost.

The designer receives an initial quote 3 for the prototype 4 and may at the same time request an approximate quote for manufacturing a large number of components according to the provided design 1. The combination of both quotes may lead to the designer wanting to redesign the part. For instance, if the estimated costs are too high, the designer may choose to reduce the size of the component. Alternatively, the designer may have a prototype manufactured, and may choose to adapt the design at a later stage after a prototype 4 has been made. In this way, the designer may make one or more prototypes 4 before continuing with the actual production of a part.

Once the designer is satisfied with the prototype 4, or when only very small adaptations are required to the design 1, the component may be manufactured using injection molding on a larger scale. The designer consults a second manufacturer 5, which can be the same or a different manufacturer than the first manufacturer 2. In addition, the second manufacturer 5 may be an intermediary company. The designer requests a final quote 6 for manufacturing a first batch of components 7, and after approving the final quote 6, the manufacturer 5 designs the injection molding process further and processes the order. The manufacturer 5 will herein also apply iterative design steps for producing an optimal mold and define optimal injection molding process parameters, such as the number and location of injection points or gates, the material of the mold, the pressure during injection or the temperature of the liquid. If the manufacturer 5 believes a design is unfeasible to be manufactured through injection molding, the order may be rejected. The designer then needs to update the model design 1 or select an alternative process for manufacture. Alternatively, the parameters are optimized and the order is accepted, which means the designer is provided with a quote 6 for manufacturing a first batch of components 7.

If/once the manufacturer 5 accepts the order, and the designer accepts the quote 6, a first batch of components 7 may be produced and delivered to the designer. If the quality of the first batch is according to expectation, the design becomes final. Generally, the volume of the first batch 7 will be relatively small, e.g., between 500 and 10000 parts, to ensure that the result is satisfactory before starting larger scale production, e.g., more than 10000 parts in a next batch. If only a small number of components is required, then production may also be completed after the first batch 7 has been produced.

If the quality of the first batch 7 is not according to expectation, it may be needed to adapt the mold and/or injection molding process parameters. Occasionally, also the design of the component needs to be adjusted. Making adaptations at such a late stage is generally time-consuming and expensive. It is therefore preferable to avoid such late adaptations. In addition, it is preferable to reduce the number of iterations in a design cycle as much as possible.

The present invention provides a quick assessment system, apparatus, and method for the manufacturability of a component that is easy and intuitive to use. Based on a measure of effective wall thickness defined as a thermal thickness as discussed below, design flaws that are specifically associated with the manufacturing process can be identified early in the process of designing and manufacturing an injection molding component.

Moreover, the invention may be used to make an estimation of the time required for a component to solidify, which allows the invention to be used by a manufacturer to provide a better quote that takes the cycle time of the mold into account. The designer will understand that if the solidification time is estimated to be large, then costs will be higher.

The invention may be applied during the initial design phase, before prototyping, and after prototyping. Moreover, the invention may be applied by the designer and/or the manufacturer and/or an intermediary company that provides a quote to the designer and outsources production.

Experienced injection mold designers generally have a rather good idea when an object cannot be manufactured at all, or is prone to have low quality. Molding or casting processes rely on a liquid-to-solid phase transition of a material being solidified in a mold. The phase transition process has many implications for the best design practices for these manufacturing processes.

Generally speaking, injection molding is only successful if there is a certain degree of uniformity of the cooling involved in the solidification. Uneven solidification is associated with undesirable outcomes, such as increased global deformations of the resulting part (warping), or local deformations (sink marks). Several factors may contribute to warping of an object, such as for instance the cooling rate, the cavity pressure, the fill rate and the melt temperature. However, the most important factor contributing to part deformation and other structural and aesthetic defects that can be influenced by the designer, is the design itself.

FIG. 2 provides examples of design features that are feasible and unfeasible according to best practices. FIG. 2A shows the side wall of a component, which the designer may like to have thicker in one region than in another. The abrupt transition shown in FIG. 2A is known to cause warping of the component. FIG. 2B shows a design with a smooth transition, which is expected to lead to better results. Similarly, FIG. 2C shows a part, which can be considered as a dense volume. Best practices of injection molding teach that sections that are too thick can lead to various defects, including warping and sink marks. Therefore, an experienced modeler would limit the maximum thickness of any section in his/her design by making them hollow as in FIG. 2D. Ribs are herein used to improve the strength of the component design structures of equal strength and stiffness but reduced wall thickness. Apart from wall thickness, also the shape of the corners of a part, and the design of the component as a whole may affect the manufacturability and quality of the result. It will be understood that while the examples of FIGS. 2A to 2D may be immediately evident to the skilled designer, it will be more difficult to immediately interpret the effects of such molding and cooling processes on more complex shapes.

The invention relates to the use of a thermal thickness value to assess the manufacturability, quality, and/or cost of a component. The thermal thickness is a geometric property that allows for intuitive feedback of design suggestions, can be computed rapidly, and is not conditional on specifics of the manufacturing process. The latter is beneficial as the manufacturing process has many details which are not designed during the initial stages. For example, the injection points are generally still unknown when a designer first designs his component and makes a prototype using an alternative technique like 3D printing. As such, injection molding process parameters such as the path of the flow, or the pressure in the mold are not yet known. At that stage, providing feedback in the most general terms is preferred.

The thermal thickness is here considered as a measure of thickness that provides insight into the thermal process of cooling the liquid in a mold. The thermal thickness is positively correlated with the time for the surface of an object to solidify. A larger thermal thickness means that more liquid volume is present behind the surface, and as such that more heat needs to escape through the boundary of that surface.

The thermal thickness is defined everywhere on the surface of the object. An intuitive interpretation of the thermal thickness is given as the localized volume-to-area ratio of a body at a point on its surface. Herein the volume of the body contains a certain amount of heat, which escapes through a certain unit area of the boundary surface of the object. Hence the thermal thickness is naturally expressed in units of length. For example, in a sphere the thermal thickness is constant on the boundary surface due to the symmetry of the object. In other objects, the thermal thickness will vary along the surface. Relevant for the manufacturability of an injection molding design are both the absolute values of the thermal thickness after normalization, as well as their uniformity.

The thermal thickness provides insight into the cooling and solidification dynamics and thereby differs from other measures of thickness. For example, a thin circular plate of 1 mm "thickness" is, according to the standard way of measuring the thickness of a plate using a caliper defined as 1 mm everywhere. Nevertheless, the thermal thickness of such a plate is lower at the circumference of the plate than at the center. Since an object typically solidifies or cools down quicker in its extremities, it is intuitively correct that the plate has lower thermal thickness on the boundary surface closer to the circumference. Advantageous to intuitive feedback is that simulation results are also easily understood by less experienced designers. This makes the invention beneficial to use, both for experienced as well as inexperienced designers.

Figure 3A:
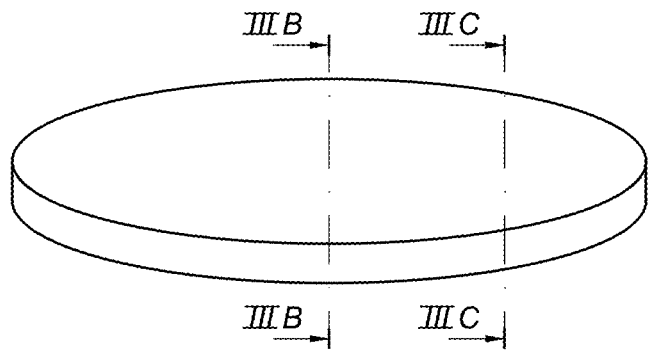
FIG. 3a-c show a representation of the thermal thickness of a circular plate along different cross sections of the plate.
Figure 3B:
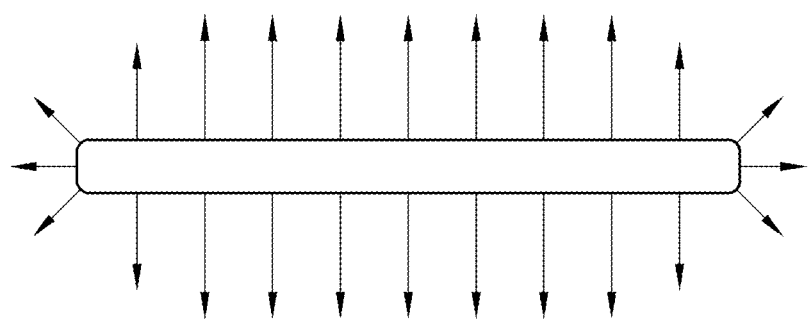
Figure 3C:
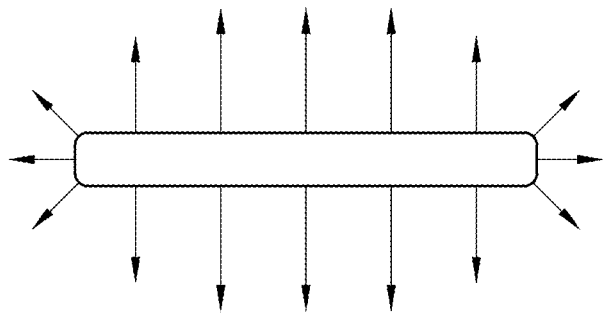

FIG. 3 schematically shows a visual representation of the thermal thickness of a thin circular plate. FIG. 3A shows a perspective view of the plate. FIGS. 3B and 3C show cross-sections of the circular plate with a visualization of the thermal thickness. The length of the arrows indicates the thermal thickness at different positions along the exterior surface of the circular plate. As described above, the thermal thickness is lowest at the circumference of the plate.

Figure 4:
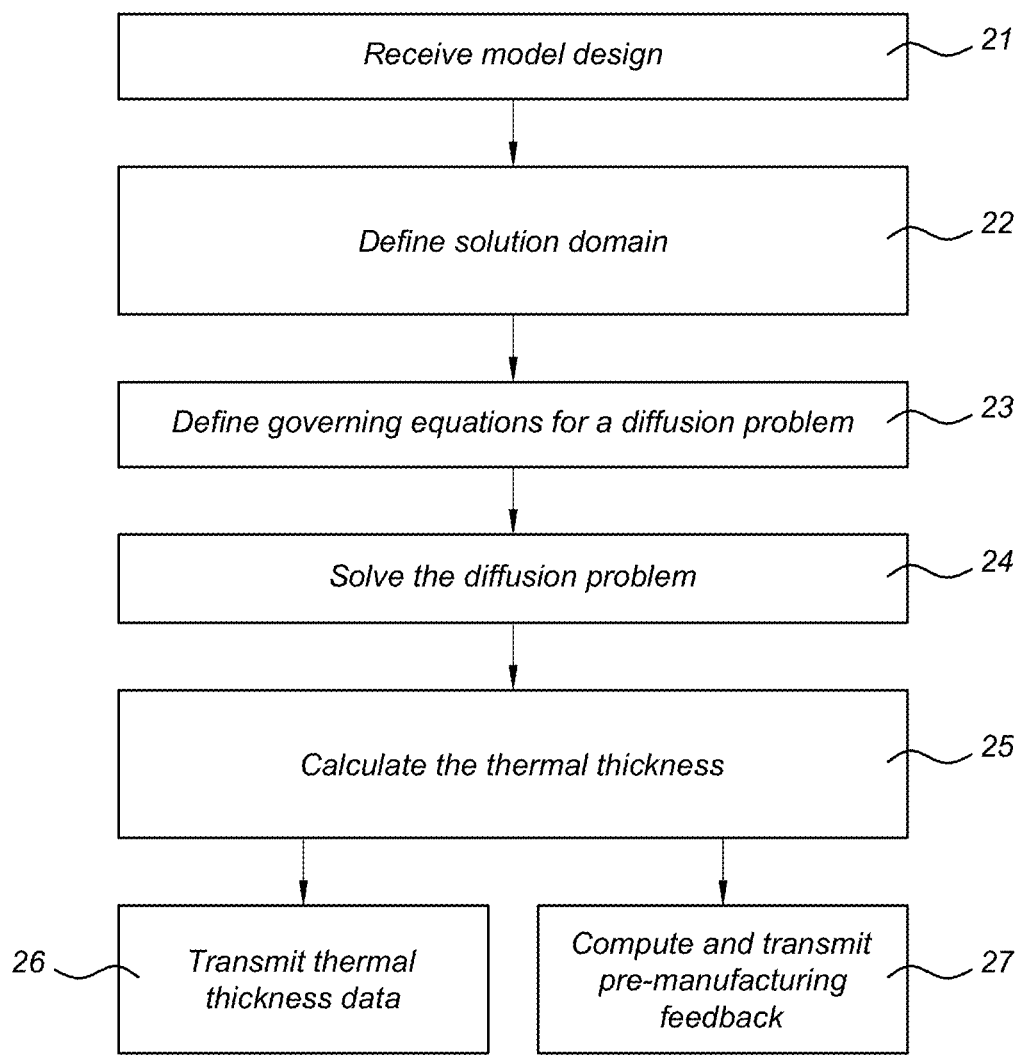
FIG. 4 presents a flow chart of a method for calculating the thermal thickness of a design and/or providing pre-manufacturing feedback.

FIG. 4 schematically shows a flowchart of an embodiment of a method to compute a thermal thickness value. A processor receives a three-dimensional model of a physical object or of a mold at step 21, and subsequently executes one or more processes to define a solution domain at step 22. This solution domain comprises at least the cavity-mold interface b, which may be easily derived from the object boundary surface or from the design of a mold. The solution domain may further include the interior volume I of the physical object and/or an exterior volume O representing a volume outside the volume. In embodiments, the exterior volume O can represent the mold, yet the volume may also be an unspecified volume that is simply exterior to the physical object. A definition of the solution domain is discussed in detail with reference to FIG. 9 below.

The thermal thickness is found by solving an equation or a set equations over the solution domain. To that end, the processor first defines governing equations over the solution domain (step 23). The governing equations represent heat release through the cavity-mold interface when the object is formed through solidification of the fluid in the cavity of the mold. According to the method, a source of heat is imposed in the interior volume I, representing the heat to be removed during the cooling of a part. In addition, a sink of heat is imposed at the cavity-mold interface b or in the exterior volume O, representing the dissipation of heat.

Next, the processor solves the governing equations (step 24) and computes the thermal thickness (step 25). The thermal thickness is found as a measure for the relative inclination of heat to leave the interior volume I through the cavity-mold interface b. The thermal thickness is defined to be proportional to this quantity everywhere on the cavity-mold interface b.

After that, the processor transmits the thermal thickness data to the user and/or displays it on a display (step 26). Alternatively, or in addition, the processor computes pre-manufacturing feedback and transmits it to the user and/or displays it on a display (step 27). The pre-manufacturing feedback may for instance include information on the manufacturability of a design, the expected quality of the product, the approximate production time or an approximation for the production cost.

There are various ways to formulate and solve a governing equation or system of equations that allows for calculation of a thermal thickness thereafter (steps 23-25). In an embodiment, the equation is a steady-state diffusion equation, also known as the Poisson equation:

$$k\Delta T = c, \ x \in I,$$

where the constant c represents a constant source of heat in the interior volume I. Here c=1 is a constant in the interior volume I, and arbitrarily chosen. The parameter k represents a thermal conductivity value [W/mK] of the material in the cavity of the mold. Preferably a constant conductivity value k is chosen that is representative for plastics in general. For example k=0.2 W/mK.

As boundary condition a constant low temperature T0 is imposed on the cavity-mold interface b, i.e., $$T = T0, \ x \in b.$$

Here T0=0, representing a constant zero-temperature heat sink on the boundary.

These equations are solved numerically (step 24) and the thermal thickness is computed (step 25) at the cavity-mold interface b, wherein here the thermal thickness t is defined in terms of the solution of the above problem as:

$$t = \frac{\partial T}{\partial n}, \ x \in b.$$

where n is the outward normal vector on the cavity-mold interface b.

According to another embodiment of the method, the governing equations are formulated as a steady-state screened Poisson equation (step 23):

$$k\Delta T = J, \ x \in I \cup O,$$

wherein $$J(x) = \begin{cases} c, & x \in I \\ -aT, & x \in O. \end{cases}$$

Here the parameter a is a temperature decay parameter. This parameter is generally chosen sufficiently large such that the temperature goes to zero over a distance of a relatively short distance outside of the domain. The skilled person will understand that for very large values of the temperature decay parameter, i.e., a→∞, the solution of the equations converges to the solution of the steady-state Poisson equation as described above.

The heat conductivity value k is also dependent on the spatial variable x. Typically, in an injection molding process, the mold material has a much higher thermal conductive than its content. Therefore in embodiments, a first constant value of the conductivity k is imposed in the interior volume I, and a second constant value of the conductivity k is imposed in the exterior volume O. Alternatively, also only a ratio between the first and second constant values of the conductivity k may be imposed as it is mainly the large difference in order of magnitude between the thermal conductivities of the materials is relevant; the precise values do not significantly affect the solution of the equations. Similarly, in an investment casting process, where typically the mold material is less thermally conductive than its content, also the ratio between the two conductivities is the parameter that affects the thermal thickness most.

Formally speaking, a solution of the equation may only be obtained when also at the external domain boundary of the solution domain comprising the interior volume I and exterior volume O. In a preferred embodiment, the external domain boundary is positioned sufficiently far from the cavity-mold interface b of the physical object, i.e., the cavity-mold interface, for the external domain boundary not to affect the solution of the temperature variable T at the cavity mold interface b. In a further preferred embodiment, a periodic boundary condition is enforced. Advantageously, one does not need to bother about imposing actual values at the boundaries.

According to the method, the above governing equation is solved (step 24) and the thermal thickness is calculated (step 25). In this embodiment, the thermal thickness t is defined as the temperature T at the cavity-mold interface b, i.e., $$t=T, x \in b.$$

The Poisson equation and screened Poisson equation as described in the above two embodiments are solved numerically. The governing equations are discretized using any conventional method, such as a finite difference, finite volume, or a finite element method. For the discretization, the solution domain is subdivided into a plurality of interconnected sub-volumes, cells, voxels, or a three-dimensional mesh or grid. The resulting cells or volumes can be cubic but alternatively may have any other shape, for instance a tetrahedral or cuboid shape. In addition, the mesh, or grid, may be structured or unstructured. The cubic grid is regular, yet in embodiments the grid may contain a local coarsening or fining of the mesh. In embodiments of the method, also a 2D boundary element method may be used. The skilled person will understand that the selection of the numerical method should by no means be considered to limit the scope of the invention. Other numerical methods may be equally suited to numerically solve the governing equations.

In a preferred embodiment a regular cubic grid is used. This avoids the need for explicit meshing and construction of linear operators, but rather the Poisson operator can be implemented using a simple convolution operator, allowing optimal use of contemporary hardware and software ecosystems tailored to working with convolutional operators efficiently. The resulting discrete equations are solved using a multigrid solver, giving optimal performance proportional to the number of grid cells or voxels employed.

Although this is a preferred embodiment, it is understood that discretizing and solving such the governing equations can be accomplished using any of the many known methods amenable to such a problem type. Moreover, it will be understood that the numerical method is selected in correspondence with the selected formulation of the governing equations. For example, it will be understood that particle models may be formulated to approximate a Poisson equation. Such an approximation may for instance be found by randomly generating particles in the interior volume I according to a uniform distribution and simulating a random walk of these particles. By recording where each of a large number of particles first hits the cavity-mold interface b, the likelihood of heat exiting through each part of the cavity-mold interface b may be mapped. The density of particles exiting through a certain area of the cavity-mold interface is proportional to the thermal thickness. In such embodiments, particle methods and associated governing equations may be used to approximate the solution of a diffusion equation.

It should further be understood that also transient numerical methods for solving an unsteady diffusion equation may be used to approximate the steady state solution. Therefore all transient numerical methods for solving diffusion problems that can be viewed as approximating the steady state Poisson equations described here should be considered functionally equivalent for the purposes of the stated invention.

In the above described preferred embodiments, the thermal thickness is linear with respect to scaling of the input geometry, rotation-invariant, and non-negative. In addition, the thermal thickness is a continuous variable. Accordingly, an infinitesimal change to the geometry always results in an infinitesimal change in thermal thickness. In addition, also an infinitesimal change in spatial coordinates along the boundary surface of the object results in an infinitesimal change in thermal thickness.

The continuity of the thermal thickness is a highly preferable feature for a measure of efficient wall thickness. The outcome of the manufacturing process will also vary in a continuous fashion with part geometry and any arbitrarily large change in predicted manufacturing outcome, based on an infinitesimal change in input geometry, will have to be considered a spurious effect for the purposes considered here. In addition, the continuity is one of the properties that makes the thermal thickness an intuitive measure.

In embodiments, the thermal thickness is a geometric property and entirely independent of the material used. Moreover, in embodiments the thermal thickness is not dependent on the injection molding process parameters. The invention may therefore be applied without providing gate details.

In embodiments, an additional mapping is applied after the computation of the thermal thickness, i.e., after step 25 and before steps 26 and/or 27. This mapping may be empirically of heuristically determined with the aim to aid the intuitive interpretation of the thermal thickness parameter. For example, the thermal thickness may be normalized and/or scaled in such manner that the thermal thickness of an infinitely long and wide plate corresponds to the thickness assigned to such a plate given the usual definition for the thickness of a plate, e.g., the distance from a top surface to a bottom surface along the surface normal. Such a mapping contributes to an easy and intuitive interpretation of the thermal thickness by a user.

Figure 5A:
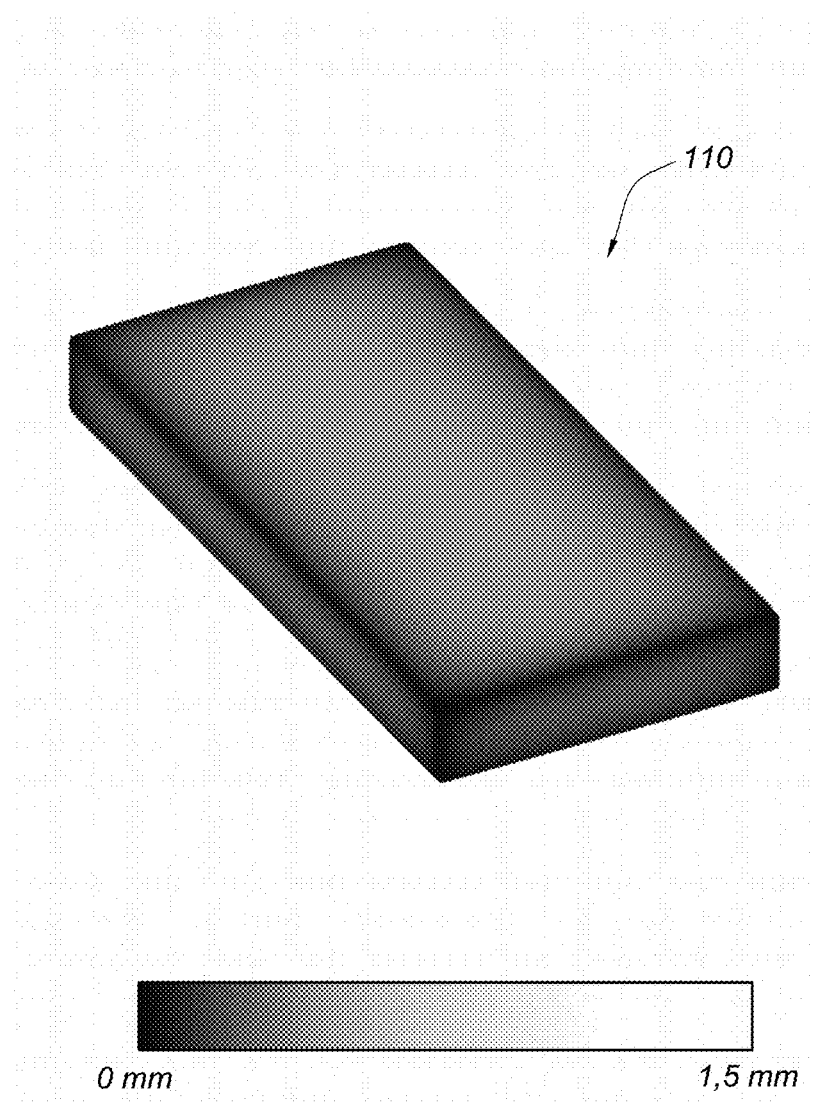
Figure 5B:
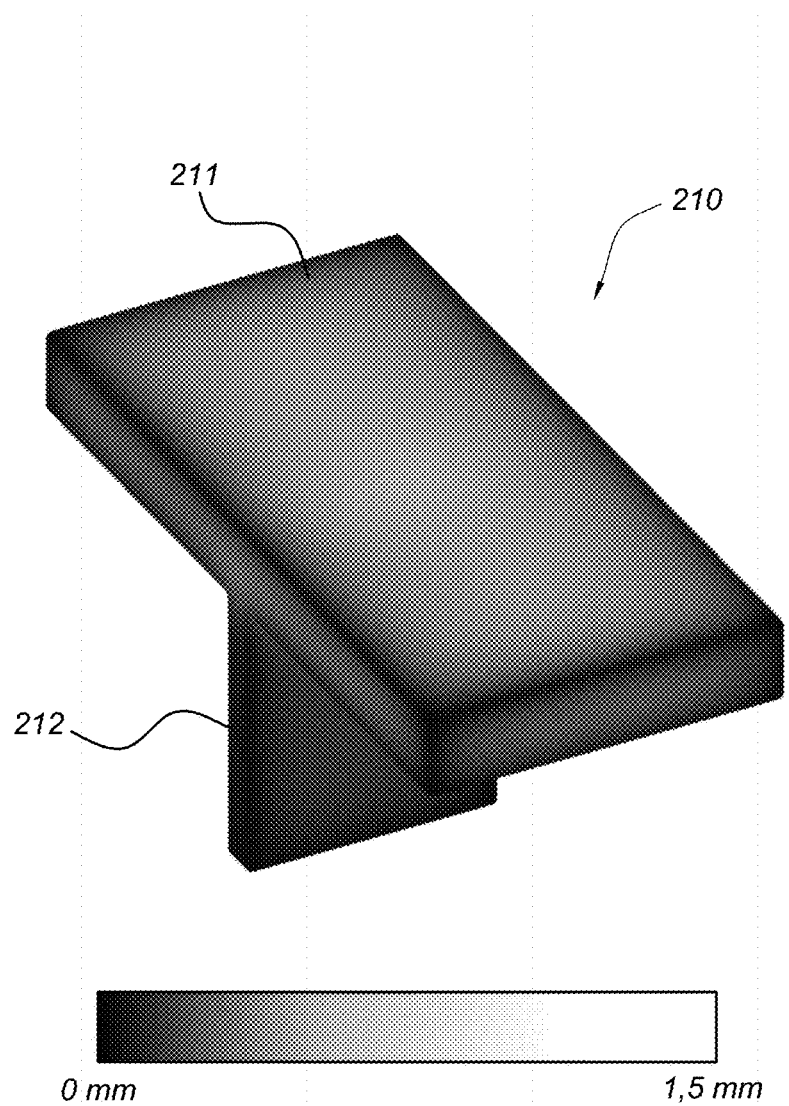

FIGS. 5*a*-5*c* show examples of the calculated thermal thickness mapped onto the exterior surface of a component to be manufactured. The intended surface required for the design is a thin flat surface, yet as commonly encountered in injection molded parts, ribs are added to sufficiently stiffen the part. The thermal thickness as shown has been normalized according to the procedure set out above.

FIG. 5*a* shows a part 110, which is essentially a flat plate having a "geometric thickness" of 1 mm when measuring the thickness using a caliper. The maximum thermal thickness occurs at the center of the plate, and has a value, after normalization, of 1 mm. The thermal thickness gradually reduces towards the extremities of the plate where the thermal thickness is almost 0 mm.

FIG. 5b shows a component 210 with a flat section 211 that is similar to the plate 110 in FIG. 5a. In addition, a thin rib 212 is added to stiffen the flat section 211. A comparison of FIGS. 5a and 5b shows that the impact of the thin rib on the thermal thickness of the flat section 211 is minimal. The thermal thickness as shown does not lead to concerns regarding the manufacturability of component 210.

FIG. 5c shows a component 310 with a flat section 311, and a rib 312. The rib 312 is thicker than the thin rib 212 of FIG. 5b. More precisely, the rib 312 has a geometric thickness of 1.5 mm. This is against a common rule of thumb in designing injection molding designs that such ribs should be kept thinner than the surface they connect to. Otherwise there may be a cosmetic impact on the opposing surface to which the rib connects. As shown in FIG. 5c, the rib 312 leaves an imprint on the thermal thickness of the surface opposite to the surface where the rib is attached, indicating a significant difference in cooling rate or solidification rate over the surface opposing the rib.

In this example, the uniformity of the thermal thickness is used to provide feedback on the part design. However, the thermal thickness result may be used in other ways as well.

Firstly, the designer may check if the thermal thickness is not too thick and not too thin for manufacture. Preferably, the thermal thickness of a component is less than 20 mm, and more preferably less than 10 mm. A designer is therefore warned if the thermal thickness anywhere along the component's surface exceeds these values. For too large values, an adjustment may be required.

Conversely, excessively low values of thermal thickness can be problematic as well as they may imply that a proper filling of the mold may be complicated. If the volume of the component is close to an acceptable lower limit, designers should be warned that problems are to be expected. Preferably, the thermal thickness of a component is at least 0.8 mm, and more preferably at least 1 mm.

In preferred embodiments, the thermal thickness is not dependent of the material of the object. Nevertheless, this does not mean that the manufacturability of the object is independent of the material selected by the user. The feasible limits for the thermal thickness may depend on the material selected. The table below provides an example of ranges feasible when using a certain material for injection molding.

| Material | Recommended wall thickness [mm] |
|---|---|
| Polypropylene (PP) | 0.8-3.8 mm |
| ABS | 1.2-3.5 mm |
| Polyethylene (PE) | 0.8-3.0 mm |
| Polystyrene (PS) | 1.0-4.0 mm |
| Polyurethane (PUR) | 2.0-20.0 mm |
| Nylon (PA 6) | 0.8-3.0 mm |
| Polycarbonate (PC) | 1.0-4.0 mm |
| PC/ABS | 1.2-3.5 mm |
| POM (Delrin) | 0.8-3.0 mm |
| PEEK | 1.0-3.0 mm |
| Silicone | 1.0-10.0 mm |

The above ranges and numbers for minimum and maximum are only indicative and should in no means be considered limiting or explanatory for feasible and unfeasible designs. Experienced mold designers will understand that generally speaking there are certain minima and maxima for thermal thickness required, yet these ranges may depend on the entire design. For instance, the overall size of the object may also play a role in identifying appropriate boundaries.

Another application of the thermal thickness relates to an assessment of the uniformity of the thermal thickness to reduce global deformations. Experienced designers and manufacturers are aware that so-called warping of an object may occur when solidification takes place unevenly. When one side of the object is warmer than the other side, the colder side of the part bows inwards towards the hot side of the object. This can lead to a global deformation of the part, known as warping. An uneven shrinking between areas of the part may also lead to warping. The skilled person will therefore understand that generally speaking, better process outcomes can be expected when a part is designed to have more uniform thermal thickness.

The thermal thickness can further be used to estimate a cooling time variable, e.g., a time required to sufficiently reduce the stickiness at each point along the cavity-mold interface before the mold can be removed without causing damages. It will be understood that a positive correlation exists between the thickness of a part and the time to cool or solidify the surface before the mold can be removed. Formulae, empirical relations, standard statistical methods and/or any other suitable mapping may be used to convert the thermal thickness value in a manner that it aids a prediction of the cycle time.

The thermal thickness approximation may further be used to search for an optimal solution regarding one of the above aspects. For example, a design wherein the risk of warping or sink marks is optimized or a design wherein the cycle time is minimized. In addition, the thermal thickness may be used for multi-variable optimization, wherein simulations of the thermal thickness may for instance be used to seek a solution that reduces sink marks, warping, or other flaws, while also reducing cycle time.

Figure 6:
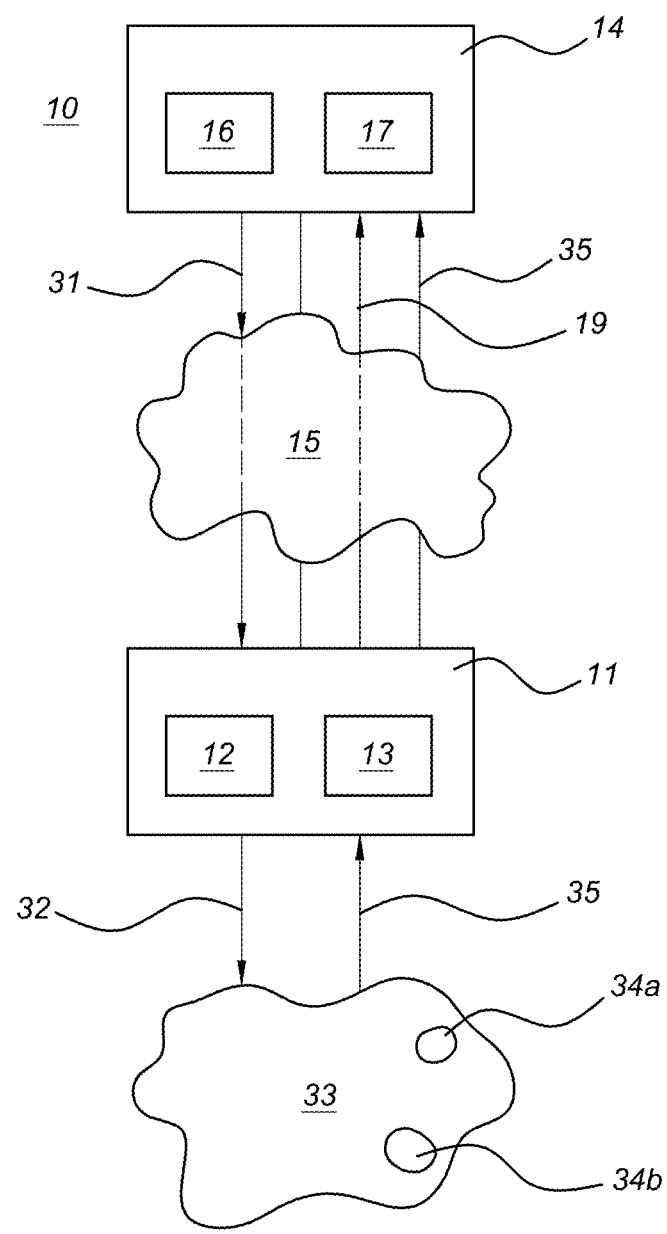
FIG. 6 schematically shows an embodiment of a system for providing pre-manufacturing feedback.

FIG. 6 shows a schematic diagram of an embodiment of a system 10 for providing real-time quotation or manufacturing feedback for a three-dimensional object that is to be formed through solidification of a fluid in a mold. More specifically, the system 10 can be suited to assess the feasibility and quality when manufacturing a batch of components through injection molding before sending out an order for manufacture. The system 10 can also be suited for estimating a cost of manufacture. The system can further be suited for estimating a cycle time for a mold used; or be used to determine whether a specific type of material may be used to form the object.

The system 10 comprises a server 11 having one or more processors 12 and one or more memory devices 13. The memory devices 13 can include a transitory computer readable memory, a non-transitory computer readable memory, or both. The system 10 further comprises a user device 14, such as a personal computer, portable computer, tablet, smartphone or the like, which may be connected to the server 11 through a network 15. The network 15 can include any type of conventional communication network, such as the Internet, a local area network (LAN), a wide area network (WAN), or a metropolitan area network (MAN). Also various types of telephone networks and mobile networks may be used. The server 11 and user device 14 are adapted to allow communication of the server 11 and user device 14 over the network 15. Alternatively, in the specific situation wherein a user is physically close to the server 11, no network 15 is needed and the user device 14 may be connected to the server 11 directly.

The user device 14 typically includes an input device 16 such as a keyboard, mouse, or microphone, and a display device 17. The user can use the user device 14 to access the server 11 and the services provided by the server 11. For instance, the user can enter a Uniform Resource Locator (URL) in a web browser using the input device 16, the URL corresponding to a domain hosted by the server 11. Accordingly, a web page with a user interface 18 (see FIG. 7) is displayed on the display device 17. The user may use the user interface 18 to interact with the server 11. For example, the user may upload a digital model design 31 representing a three-dimensional physical object to the server 11. The processor 12 of the server 11 may then carry out the method as shown in FIG. 4. As the final step of that method, manufacturing feedback or a quote for the uploaded three-dimensional model design 31 is send to the user through the user interface 18. An embodiment of a user interface 18 is discussed in more detail with reference to FIG. 7 below.

Based on the digital model design 31 of a physical object to be manufactured, the system 10 is configured to assess variables of the manufacturing process associated with the physical object in near real-time. The generated quotation and/or manufacturability feedback 19 are sent by the server 11 to the user.

When the digital model design 31 is approved as final design by the user, the user can send it out in a request for manufacture 32 to the supply chain 33. A manufacturer 34a, 34b in the supply chain 33 may pick up the request 32 and design a mold that is appropriate for manufacturing the product, eventually leading to manufacture of the part. Alternatively, the manufacturer 34 may return more detailed feedback 35 on the design, for instance rejecting the order or asking for adaptations. Via the server 11 and network 15, the feedback 35 can be forwarded to the user.

In this configuration a check on the manufacturability of the digital model design 31 is performed before sending a request 32 to the supply chain 33. This allows a designer to filter out unfeasible designs in a relatively early stage, avoiding unnecessary costs.

Figure 7A:
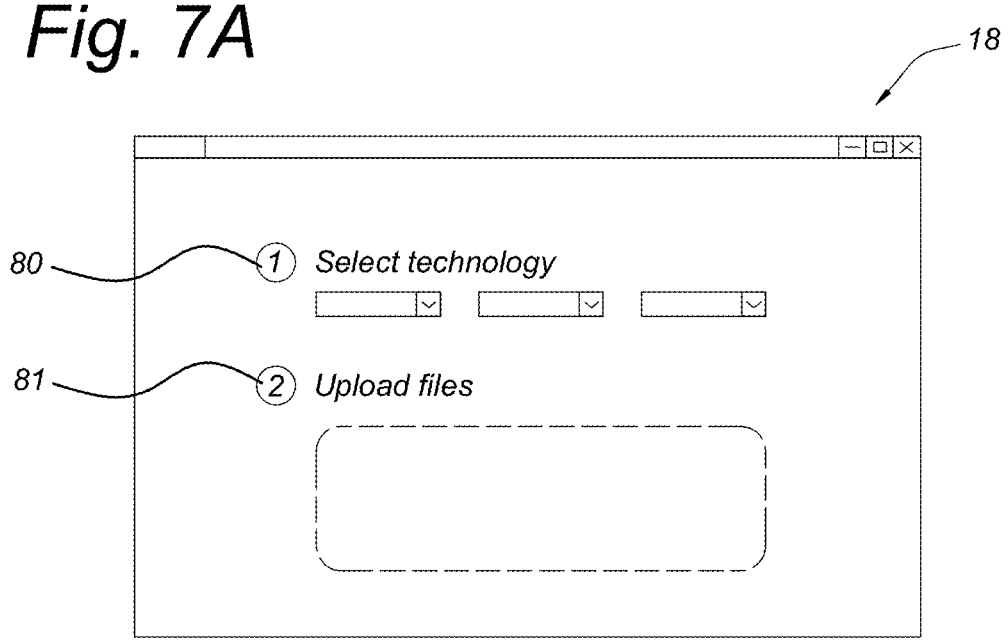
Figure 7B:
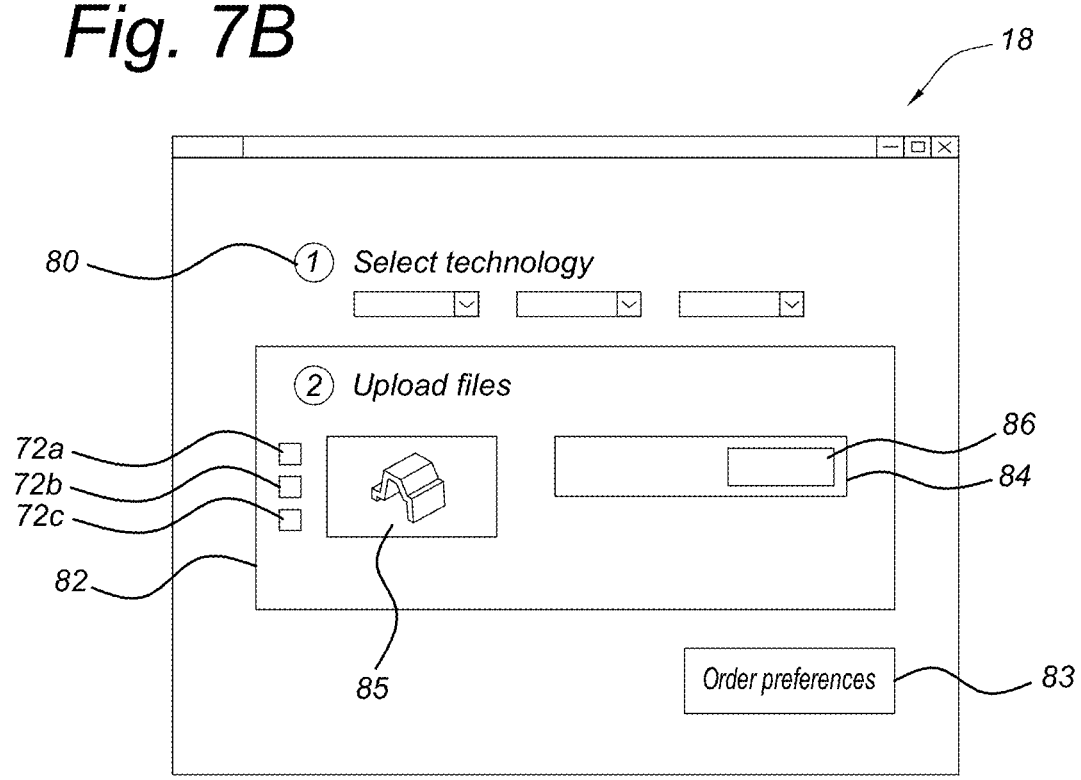

FIGS. 7A-7C show an exemplary embodiment of a user interface 18 that could be used in the system 10 in FIG. 6 to provide the results of the thermal thickness to the user.

FIG. 7A shows a user interface 18, which is a graphical user interface 18. The user interface 18 comprises an upload tool 81, which may be used by a customer to upload a digital model design 31 to the server 11. This upload tool 81 may for instance be a button that opens a prompt window asking the user to select a file from an internal or external memory device, a (web)address where the file is stored or any other system/method that results in a digital model design 31 as selected by the user being received by the server 1. The upload tool 81 here can be clicked on with a mouse to open a prompt window to specify an upload location, and may be used as a drag-and-drop system. In addition, the graphical user interface 18 in FIG. 7A comprises a selection menu 80 to select a technology for manufacture, such as injection molding.

FIG. 7B shows the graphical user interface 18 after a digital model design 31 has been successfully uploaded. The graphical-user interface 18 then reveals a configuration tool 82. The configuration tool 82 comprises a number of configuration buttons 72 that allow a customer to configure his/her design of the physical object further. For example, configurations associated with the material used for the manufacture, the color of the material, and the type of material used for manufacturing the mold of the object, may be selected through the configuration buttons 72 of the configuration tool 82.

In addition, the graphical user interface 18 may comprise an ordering preference menu 83. The ordering preference menu 83 provides a customer with the opportunity to enter selection criteria for the production process. Examples of selections that could be entered through the ordering preference menu 83 are the preference for a specific manufacturer, placement of an "urgent" order, or a certain deadline for delivery. In addition there may be process related preferences such as receiving, storing, or destroying the mold after production of the components, or manufacture of the mold of a specific material that can be entered through the preference menu 83.

All selections and preferences entered by the user are received by the server 11. The server 11 may be configured to perform a manufacturability analysis and/or compute a quotation directly upon receiving new input. The server 11 may also be configured to perform a manufacturability analysis and/or compute a quotation after this is requested by the customer. In this embodiment, both the manufacturability analysis and a quotation are directly computed each time the customer enters a new selection.

The graphical user interface 18 further comprises a quotation tool 84 and a design for manufacturability feedback tool 85. The quotation tool 84 and/or the design for manufacturability feedback tool 85 can be used by the customer to assess the pre-manufacturing feedback on the design. The quotation tool 84 has a quote display window 86, wherein a quote for manufacturing the object is displayed. A quote for manufacturing a component is typically based on a combination of different constant costs, including for instance costs associated with the production of the mold, and variable costs that increase with the number of components produced. The variable costs are influenced by the cycle time of the component, i.e., the time the mold and machine equipment are being appointed for producing a single component. In preferred embodiments of the system 10, the output data on thermal thickness is used to estimate a cycle time and used in the calculation of the quote.

Via the quotation tool 84 the costumer may select or enter the number of components that should be manufactured. The quote displayed through the quote display window 86 may automatically change in dependency of the number of components entered through a quantity box 87. The quote display window 86 may display the total cost, but the quote display window 86 may also display the cost to manufacture one component according to a manufacturing process request. The quote display window 86 shown in the embodiment in FIG. 7B can display both the total cost and the cost per piece.

The design for manufacturability feedback tool 85 may be used by a customer to access the pre-manufacturing feedback on the uploaded design. FIG. 7C shows the graphical user interface 18 after the manufacturability feedback tool 85 has been activated. The manufacturability feedback tool 85 provides several ways to visualize, display, transmit, and present output data 11 to a user. Typically, the manufacturability tool 85 will provide the user with some global feedback 88 whether the design or certain parts of it are suitable for manufacture and/or whether the quality is expected to be good. In addition, the manufacturability tool may also comprise a visualization tool 89 that provides several options to visualize the feedback 88.

The manufacturability feedback tool 85 has an option to show global feedback 88 regarding a number of aspects through the graphical user interface 18. The displayed aspects may be predefined, or may for instance be selected in a checklist. For example, a first aspect 91 of the global feedback 88 may involve whether the component is prone to show sink marks. The manufacturability feedback tool 85 may indicate the likelihood of whether sink marks are expected, may indicate how severe these sink marks can be, e.g., using a grading system between 1 and 5, or how many sink marks are to be expected.

A second aspect 92 of the global feedback 88 may relate to the case of a component where the thermal thickness of the walls is too large. As indicated above, thick walls may lead to sink marks, and in addition may result in a long manufacture time for the part. Consequently, the cost of the parts may increase as well. It is therefore not preferable to have thick walls, and for unfeasible values the users may be warned that the design is not feasible to manufacture. In addition, if the thermal thickness of the wall has a high but not unfeasible high value, users may be warned about the implications thereof such as increased costs. The manufacturability feedback tool 85 may be programmed to give a warning to the user if the thermal thickness anywhere along the component's surface exceeds the value of 10 mm. In addition, if the thermal thickness anywhere along the component's surface exceeds the value of 15 mm, a more urgent warning may be given to the user, possibly with a negative advice against having the component according to the uploaded design manufactured. The manufacturability feedback tool 85 may hereby use upper bounds for generating the warnings that are dependent on the material selected. Alternatively, material specific feedback may be provided, indicating which materials are feasible for manufacture and which are not.

A third aspect 93 of the global feedback 88 may relate to a too thin thermal thickness of the walls of a component. Similar to the case for a thermal thickness that is too large, the feedback tool 83 may be programmed to issue warning when the thermal thickness is less than 1 mm, or when the thermal thickness anywhere along the component's surface is less than 0.8 mm.

A fourth aspect 94 of the global feedback 88 may relate to an assessment of the uniformity of the thermal thickness. The global feedback 88 may comprise information whether the uniformity is considered sufficient or insufficient. Global feedback in this aspect may be difficult, and therefore preferably the graphical user interface 18 also comprises a visualization tool 89. The visualization tool 89 can be used to map output data or a derivative thereof onto the boundary surface of the digital model and display it. The thermal thickness may be visualized using for instance the visualization as indicated in FIG. 3 or 5. It will be understood that many other ways for visualizing the data exist. The customer may rotate the object to observe it from different angles and is thereby able to observe the thermal thickness everywhere along the surface.

The visualization tool 89 has as a benefit that it eases the communication of feedback on certain design aspects. The manufacturability of a design is best not regarded as a simple yes/no affair. Instead of having a trained engineer trying to explain that may be a part should be a little thicker on a certain side of the component, users may be encouraged to strive for maximum uniformity of the thermal thickness of their part, which they observe through the visualization tool 89. This allows the user to receive quantitative detailed feedback upon which they can act autonomously, without support by staff of the manufacturing company. The latter will not only reduce the cost, but also saves time and, in addition, may contribute to education of the designer, allowing him/her to learn faster which designs are feasible for manufacture.

An experienced designer will likely understand directly from the output data and the visualization when a design is feasible and, if it is not feasible, he will understand how to alter the model design 31. For a less experienced designer, indicator maps may help in understanding the process. These may be binary maps with for instance a "1" for a surface free of sink marks or other defects, and a "0" when defects are expected. A map e.g. with contours, may also represent the likelihood that the surface is smooth and free of defects. It will be understood that there are many different ways also to visualize the data in ways that are also suited for less experienced users.

Moreover, the visualization tool 89 is not necessarily restricted to show only output variables directly associated with the thermal thickness. For example, the visualization tool 78 may show derived information such as a cooling time variable.

In embodiments, the graphical user interface 18 may in addition comprise a button that allows the user to download the output data to the user device 14, to save the output data on the server 11, or to send the output data to a different location, e.g., an email address. The output data may be provided to the user in many different formats, such as a table specifying the data, a visualization as described above, or a STEP-file of the model design 31 to which a different attribute carrying the output data has been appended. The output data may both be the raw output data, as well as data on the mapped variables or indicators as described above. The output data may also comprise a feasibility report in which one or more aspects of the manufacturability are displayed.

The depicted graphical user interface 18 is merely exemplary and alternative user interfaces 18 may be used to exchange data with the server 11. The described embodiment is to be considered in all respects only as illustrative and not restrictive.

Figure 8:
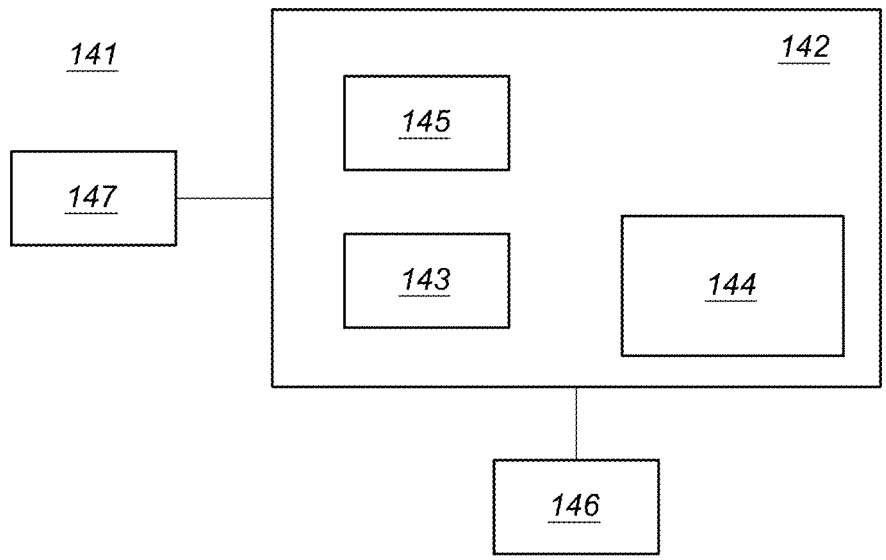
FIG. 8 shows an alternative embodiment of a system for providing pre-manufacturing feedback.

FIG. 8 shows an alternative system setup wherein pre-manufacturing feedback for a three-dimensional object can be used. In this system setup, feedback is already obtained during the design phase of an object and integrated into, or used in interface with, a CAD modelling program. The system 141 can be used for assessing a manufacturing process of a three-dimensional object during the design of the object. The system 141 includes a modeling environment 142 that comprises a design assessment tool 143 adapted to provide a quick assessment and analysis on the manufacturability of a CAD model of the three-dimensional object. The modeling environment 142 further includes a CAD modeling tool 144 adapted to allow users to build, design, engineer, edit, display, visualize, and store CAD models. In this specific embodiment, the modeling environment 142 further includes an additional mold tool 145, which allows and aids a user to easily construct a CAD-model for the mold, based on the CAD-model of the three-dimensional object.

The CAD-models of the object and/or mold developed using the CAD modelling tool 144 and/or the mold tool 145 can be analyzed by the design assessment tool 143.

The design assessment tool 143, the CAD modelling tool 144, and the mold tool 145 can be integrated all together in one program, but may also be individual programs that can be subsequently run to obtain feedback on the manufacturability or manufacture variables of a design.

The modelling environment 142 is connected to one or more memory devices 146. These one or more memory devices 146 may be present locally or at a remote location, or both.

The system 110 further includes a user interface 147 that allows users to interact with the modelling environment 142. The user interface allows users to provide inputs and receive outputs from the modelling environment 142. User inputs may be directed to each of the design assessment tool 143, the CAD modelling tool 144 and the mold tool 145 individually, to two of the tools at the same time, or to all three tools at the same time.

Figure 9:
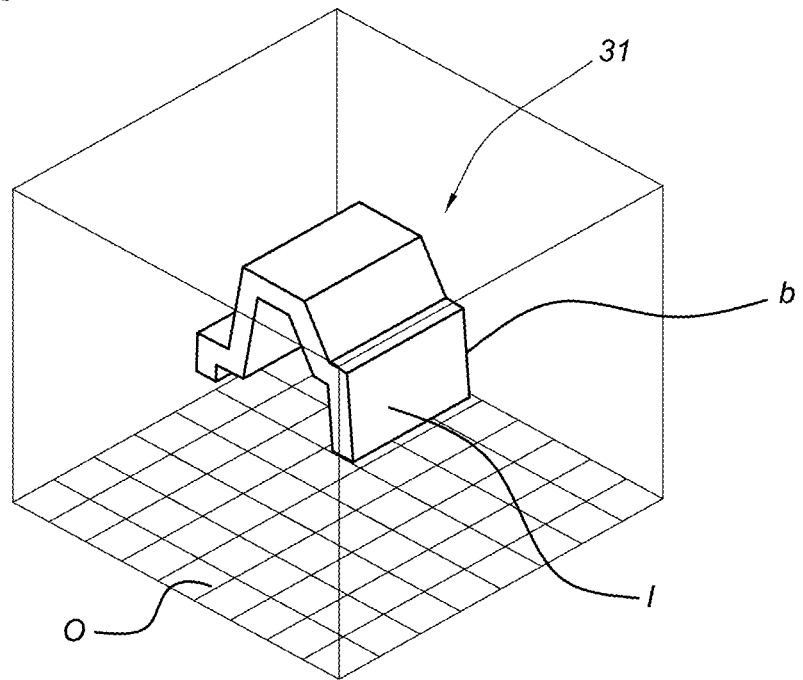
FIG. 9 shows details of the method in FIG. 4.

FIG. 9 shows in more detail the definition of a solution domain in the method according to FIG. 4. FIG. 9 shows a visualization of the digital model design 31 as received by the server 11 (step 21). The digital model design 31 is preferably a STEP-file, (Standard for the Exchange of Product Data), but may also be another suitable electronic file such as a CAD-file that includes data points corresponding to a mesh scheme of the digital model, or provides sufficient information that would allow derivation of such data. The server 11 may be configured to run additional programs to convert an uploaded design into the preferred format.

The processor 12 is configured to define a solution domain based on the received digital model 31 (step 22). As a default, the server 11 is configured to receive a model design 31 of the physical object to be manufactured. The digital model design 31 represents the interior volume I and boundary surface. The solution domain is defined to at least comprise the cavity-mold interface b, which is directly retrieved and identical to the boundary surface. In addition, the solution domain may comprise the interior volume I and/or exterior volume O dependent on the formulation of the problem. The exterior volume O may be specified in the model design 31 as part of the mold, but this exterior volume O may also be an unspecified volume that is not part of the interior volume I.

In embodiments, a user may also upload a model of the mold or a model of both the object and the mold. In that case, the interior volume I is represented by the cavity in the mold. The volume of the mold then defines the exterior volume O and an internal surface of the mold defines the cavity-mold interface b. In embodiments, the server 11 may be configured to recognize which type of model is provided.

Generally, the digital model design will be a three-dimensional model as any real-life object is three-dimensional. Nevertheless, under certain circumstances and for certain model designs the model may be simplified to a two-dimensional model. Those skilled in the art and informed by the teachings herein will realize that the invention is applicable to any other dimensionality also including one-dimensional and two-dimensional simulations, for which the properties in the respective third dimension and other two dimensions are known or can be deduced easily, e.g., for a contour in a thin plate with constant thickness according to the usual definitions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

For example, in the description above we have referred to injection molding as an exemplary industrial process wherein an object is formed through solidification of a fluid in a mold. The skilled person will understand that the methods, systems and invention described are applicable to any product formed through partial or complete solidification of a product in a mold, for instance investment casting.

The invention claimed is:

1. A manufacturing process for a three-dimensional physical object comprising the steps of
providing pre-manufacturing feedback on a design of the three-dimensional physical object that is to be formed through solidification of a fluid in a cavity of a mold, and
manufacturing the three-dimensional physical object using the pre-manufacturing feedback,
wherein providing pre-manufacturing feedback comprises the steps of:
receiving a digital model representing the mold or the three-dimensional physical object to be formed in the mold;
determining, by a processor, a solution domain for a cavity-mold interface, wherein the cavity-mold interface may represent the inner surface of the mold or the exterior surface of the three-dimensional physical object;
defining, using the processor, a computational grid in the solution domain;
solving, using the processor, an equation on the computational grid, wherein the equation represents heat release through the cavity-mold interface when the three-dimensional physical object is formed through solidification of the fluid in the cavity of the mold;
computing, using the processor, a thermal thickness defined as a numerical approximation of the temperature gradient in the outward normal direction at the cavity-mold interface;
comparing the thermal thickness with a data set stored on a memory connected to the processor, the data set comprising data on the thermal thickness of a plurality of reference objects and the manufacturability of each of the plurality of reference objects;
generating pre-manufacturing feedback by, using the processor, based on the comparison;
transmitting or displaying the pre-manufacturing feedback,
wherein the pre-manufacturing feedback comprises at least one of: information on the manufacturability of the design, expected quality of the three-dimensional physical object, approximate production time, or an approximation for production cost.

2. The manufacturing process according to claim 1, wherein the manufacturing process further comprises comparing a measure of uniformity of the thermal thickness with a feasibility range for the uniformity of the thermal thickness.

3. The manufacturing process according to claim 1, wherein the manufacturing process further comprises comparing the thermal thickness with a feasibility range for the thermal thickness.

4. The manufacturing process according to claim 1, wherein the manufacturing process further comprises comparing the thermal thickness with the thermal thickness of a plurality of reference objects, and using data on the manufacturability of each of the reference objects to assess the manufacturability of the three-dimensional physical object.

5. The manufacturing process according claim 1, wherein the manufacturing process further comprises
defining and computing an indicator variable on the cavity-mold interface, indicating where defects are likely to show;

transmitting the indicator variable to a graphical user interface (GUI), or projecting the indicator variable on the cavity-mold interface and displaying the projection on the GUI.

6. The manufacturing process according to claim 1, wherein the manufacturing process further comprises using the thermal thickness as an input variable to estimate a cycle time for the mold.

7. The manufacturing process according to claim 1, wherein the equation is a steady-state screened-Poisson equation.

8. The manufacturing process according to claim 1, wherein the equation accounts for heat resistance of the mold.

9. The manufacturing process according to claim 1, wherein a relative thermal conductivity of the mold is imposed, defined as the ratio between the thermal conductivity of the mold and the thermal conductivity of the material inside the mold.

10. The manufacturing process according claim 1, wherein the thermal thickness is a variable that is independent of the material properties of the material in the cavity of the mold.

11. The manufacturing process according to claim 1, wherein the manufacturing process further comprises using the thermal thickness to select a suitable material for manufacture.

12. The manufacturing process according to claim 1, wherein the thermal thickness is a continuous variable.

13. The manufacturing process according to claim 1, wherein the pre-manufacturing feedback is configured to display the feasibility of manufacturing the three-dimensional physical object based on the digital model; and
relying on the pre-manufacturing feedback to determine whether or not to produce the three-dimensional physical object.

14. The manufacturing process according to claim 1, wherein the thermal thickness computation is independent of the configuration of injection gates and other injection molding process variables.

15. The manufacturing process according to claim 1, wherein the three-dimensional physical object is to be manufactured through an investment casting process by pouring the fluid into the mold, which is subsequently destroyed.

16. The manufacturing process according to claim 1 wherein the manufacturing process further comprises applying a mapping to the thermal thickness before displaying it to the GUI.

17. The manufacturing process according to claim 1, wherein the pre-manufacturing feedback is transmitted or displayed to the GUI in less than 20 seconds.

18. The manufacturing process according to claim 1, wherein the pre-manufacturing feedback comprises information on the manufacturability of the design, the manufacturing process further comprising:
receiving an approval for manufacture based on the pre-manufacturing feedback; and
sending a request, in response to the approval, to a supply chain for manufacturing the three-dimensional physical object through injection molding.

* * * * *